April 10, 1928.

S. A. STAEGE 1,665,939

REGULATOR SYSTEM

Filed April 15, 1926

WITNESSES:
Wm. C. Groome
J E Hardy

INVENTOR
Stephen A. Staege.
BY Wesley G. Carr
ATTORNEY

Patented Apr. 10, 1928.

1,665,939

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed April 15, 1926. Serial No. 102,168.

My invention relates to regulator systems, and more particularly to rotary contactor type regulator systems.

An object of my invention is to provide a regulator system employing a rotary contactor type regulator with reactive means for preventing hunting action of the regulator.

My invention will be better understood by reference to the accompanying drawing in which—

Figure 1:
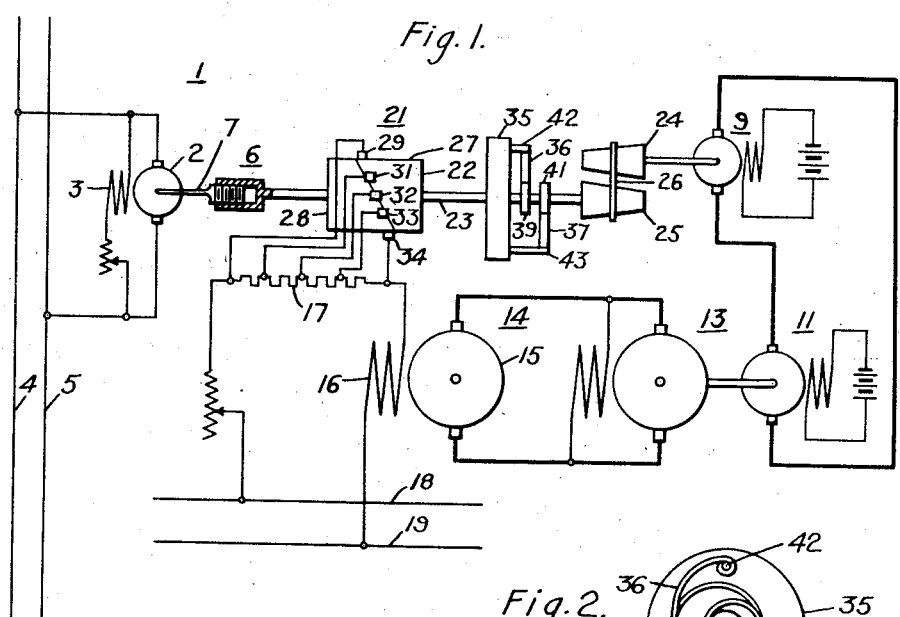
Figure 1 is a diagrammatic view of a voltage or speed regulator system embodying my invention.
Figure 2:
Fig. 2 is a side view of a flywheel reaction element.

Referring to the form of invention illustrated in Fig. 1 of the drawing, a constant speed reference means, such as the motor 1 is provided having an armature winding 2 and field winding 3 and being connected to a constant potential source of supply 4—5. The motor 1 is designed to operate at constant speed, regardless of the voltage applied to it, within certain limits, by operating it on the steep portion of the field saturation curve, so that for small changes in voltage, the changes in armature current will be substantially compensated for by similar changes in field current and field flux.

Any other constant speed source, such as a clock mechanism may be used. A mechanical differential 6 is provided, having screw and nut members, one of which is connected to the motor 1 by means of the shaft 7, and the other of which is connected to a motor 9 that is operated in accordance with the quantity to be regulated.

As illustrated in Fig. 1, the pilot motor 9 is connected to a pilot generator 11 that is so connected as to be operated in accordance with the speed of the motor 13. The motor 13 is supplied with energy from a generator 14 that is provided with an armature winding 15 and with a field winding 16. The field winding 16 is connected in series circuit relation with a resistor 17 and to the supply conductors 18 and 19. A rotary contactor 21 is provided having a drum 22 that is slidably mounted upon the shaft 23 which is driven by means of the cone pulleys 24 and 25, and belt 26, in accordance with the speed of the pilot motor 9. The rotary contactor drum 22 is provided with tapered conducting and non-conducting surface portions 27 and 28 respectively and a plurality of brushes 29, 31, 32, 33 and 34, which may be arranged spirally about the drum, and connected to sections of the resistor 17. The rotary contactor 21 may be of any suitable type, such as that disclosed in my co-pending application Serial No. 743,578, filed October 14, 1924.

As the contactor drum 22 revolves, the several brushes 29 to 34 alternately engage the conducting segment 27 and the non-conducting segment 28. While any two brushes engage the conducting segment 27, the section of the resistor 17 connected between these brushes will be short-circuited. The effective value of the resistor 17 will, therefore, depend upon the proportion of time that the several resistor sections are short-circuited.

It will be seen that the drum member is mounted to rotate with the shaft 23, but is slidable upon the shaft. The differential mechanism 6 operates to slide the drum longitudinally upon the shaft 23 in one direction or the other, as the speed of the motor 9 increases or decreases with respect to the speed of the motor 1 causing the nut and screw elements of the differential to rotate with respect to each other.

I provide a flywheel 35 that is loosely mounted upon the shaft 23, in order that it may rotate with respect to the shaft, and that is attached to the shaft by means of springs 36 and 37, the ends of which are respectively attached to the collars 39 and 41, and to the pins 42 and 43 which connect them to the flywheel. The springs 36 and 37 are preferably flat spiral springs, one mounted so as to be put under tension with a right-hand movement of the flywheel, and the other mounted so as to be put under tension with a left-hand movement of the flywheel, upon the shaft. The two springs therefore exert torque in opposite directions, and resiliently connect the flywheel to the shaft.

When the motors 1 and 9 are operating at corresponding speeds, the contactor drum 22 will occupy a fixed position beneath the brushes of the rotary contactor, and the flywheel 35 will occupy a position on the shaft such that the torque exerted by the springs 36 and 37 will be approximately equal, and the speed of the flywheel will be the same as the speed of the shaft 23. The motor 9 is designed to operate on the flat part of the field saturation curve, so that its speed will be substantially proportional to the voltage impressed upon its armature. The regulator may be used as a voltage regulator by applying the voltage to be regulated to the armature of the motor 9, or, as in the system illustrated in Fig. 1, the motor may be connected to a pilot generator 11, that generates a voltage proportional to its speed, which is proportional to the speed of the motor 13.

The system of Fig. 1 operates as a speed regulator for the motor 13, by controlling the voltage applied to the motor 13 from the generator 14. Since the speed of the motor 1 is constant and the speed of the motor 9 is proportional to that of the controlled motor 13, it will be seen that any change in the speed of the motor 13 will cause a corresponding change in the speed of the pilot motor 9, and the relative motion between the nut and screw elements on the end of the drum 22 will cause a longitudinal movement of the drum upon the shaft 23, and this longitudinal movement will cause a change in the effective resistance of the resistor 17, which will vary the current flowing through the field winding 16 of the generator 14.

The movement of the rotary contactor drum 22 will continue sufficiently to produce the required resistance change in the field winding circuit of the generator 14, so as to cause the speed of the motor 13 to return to its normal value, at which speed, the drum of the rotary contactor will cease its longitudinal movement.

Upon a change in the speed of the motor 9, the flywheel 35 will continue its normal speed for a small period of time, due to its stored energy, until one of the springs 36 and 37 has been distorted or partially wound up, developing sufficient torque to correspondingly change the speed of the flywheel. The flywheel will, at the same time, produce a reactive effect upon the shaft 23, causing the speed of the shaft to return somewhat toward its previous value, thereby producing a relative motion between the nut and screw of the differential, and changing the effective value of the resistor a certain degree in the opposite direction, thereby preventing over-travel or hunting in the regulator system.

By means of the flywheel 35 and the springs 36 and 37, the regulator may be designed to have a very steep regulating curve, whereby the regulator will over-excite the fields of the generator and thus give sufficient reactive effect to prevent over-shooting or hunting. It will be noted that the reaction produced by the flywheel will be proportional to the original disturbing action so that the anti-hunting forces will have the proper value to compensate for the change in regulation required for any corrective movement.

Figure 3:
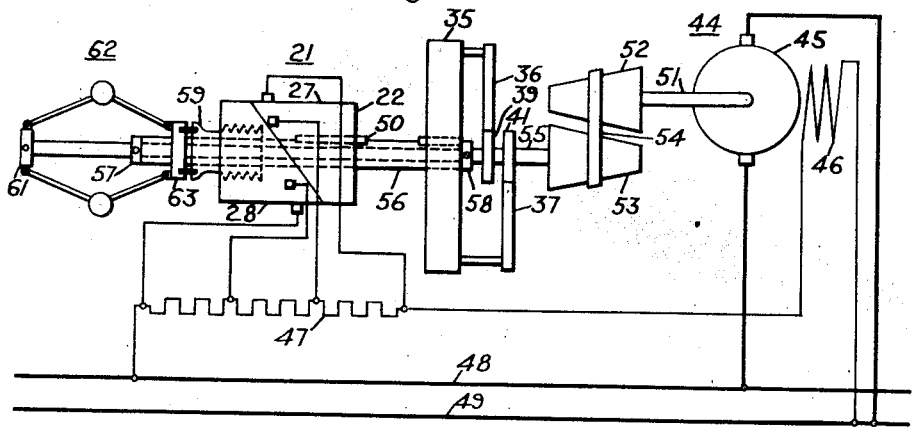
Fig. 3 illustrates a flyball governor speed regulator, comprising a rotary contactor and a flywheel reaction element.

Referring to the form of invention illustrated in Fig. 3 of the drawing, a motor 44 is provided with an armature winding 45 and a field winding 46 that is connected through a resistor 47 to the supply conductors 48 and 49. The motor 44 is connected by means of a shaft 51, cone-pulleys 52 and 53 and a belt 54 to a shaft 55. Upon the shaft 55 a sleeve 56 is provided between the collars 57 and 58, which are pinned to the shaft.

The drum 22 of the rotary contactor is slidably mounted upon the sleeve 56, but is held by a spline-key 50, so as to be rotated with the sleeve 56. The flywheel 35 is rigidly attached to the sleeve 56, which is rotatable on the shaft 55, but is prevented from moving longitudinally by the collars 57 and 58. The collar 61 of the flyball governor 62 is pinned rigidly to the shaft 55 and the collar 63 of the governor is slidably mounted on the sleeve 56 and is rigidly connected with a screw member 59.

The screw member 59 threadedly engages the nut element of the differential on the interior of the rotary contactor drum 22. A longitudinal movement of the collar 63 and the screw element 59 which depends upon the amount of expansion of the governor causes a longitudinal movement of the contactor drum 22. Springs 36 and 37, similar to those illustrated in Fig. 1 are provided having their outer ends attached to the flywheel, and their inner ends attached to the shaft 55. The shaft 55 is driven by the motor 44 through the speed changer device, consisting of the cone pulleys 52 and 53 and the belt 54, so that the shaft 55 can be operated at constant speed, even though the speed of the motor 44 may be required to vary over wide ranges.

Any movement of the contactor drum 22 will effect a change in the resistance 47, thus varying the excitation of the motor 44, and for any fixed position of the screw 59 within the contactor drum 22, a variation in the speed of the motor 44 will cause a corresponding movement of the collar 63 and of the contactor drum. Therefore, any change in the speed of the shaft 55 will cause a longitudinal movement of the drum 22. Also, any change of the angular position of the flywheel 35 with respect to the shaft 55 will cause relative angular movement of the contactor drum 22 with respect to the screw element 59, and thereby cause a longitudinal movement of the drum 22, independently of any movement of the collar 63 and the screw member 59.

Assuming that the shaft 55 is operating at some definite speed, and that the flyballs are occupying some definite position, the rotary contactor drum 22 is occupying such position with respect to the brushes that the effective resistance in the field circuit of the motor is of the desired value to maintain constant speed. Should the speed of the motor drop suddenly because of an increase in load, the flyball governor would contract and the collar 63 would move to the right, carrying the drum 22. The flywheel 35, on account of its stored energy will, however, continue to run at its original speed for a short period, causing the drum 22 to operate at its previous speed, although the speed of the screw elements 59 will fall. The drum 22 is therefore moved still further to the right.

During the interval that the flywheel is running at a higher speed than the shaft, one of the springs 36 or 37 will be winding up and produces a torque between the flywheel 35 and the shaft 55 that will, in turn, produce relative movement of the sleeve 56 and the shaft 55, and, consequently, between the screw element 59 and the drum 22 in the opposite direction from that just described. The drum 22 is, consequently, moved toward the left to its original position with respect to the screw element 59.

It will be seen, therefore, that the reaction of the flywheel causes a decrease in the corrective movement of the regulator preceding the complete regulator action, thereby compensating for the natural tendency for the regulator to lag behind the changes in the regulated quantity, and to prevent hunting action.

Many modifications may be made in the apparatus and arrangement of parts illustrated, without departing from the spirit of my invention, and I do not wish to be limited other than by the scope of the appended claims.

I claim as my invention:

1. In a regulator system, a resistor, means for varying the effective value of said resistor comprising a rotary contactor drum, means for rotatively actuating said drum in accordance with the regulated quantity, means for actuating said drum longitudinally in accordance with variations of the regulated quantity from the desired value, and inertia means for actuating said drum temporarily to prevent hunting action in the system.

2. In a regulator system, a resistor, means for varying the effective value of said resistor comprising a rotary contactor drum, means for rotatively actuating said drum in accordance with the regulated quantity, means for actuating said drum longitudinally in accordance with variations of the regulated quantity from the desired value, and inertia means for temporarily influencing the rotation of said drum upon a change in the regulated quantity to prevent hunting action in said system.

3. In a regulator system, a resistor, means for varying the effective value of said resistor comprising a rotary contactor drum, means for rotating said drum in accordance with the regulated quantity, a constant speed device, means for actuating said drum longitudinally in accordance with variations in the speed of said drum and said constant speed device, and inertia means effective upon a change in the speed of said drum for influencing the rotation of said drum in a reverse direction to prevent hunting action.

4. In a regulator system, a resistor, means for varying the effective value of said resistor comprising a rotary contactor drum, means for rotatively actuating said drum in accordance with the regulated quantity, means for actuating said drum longitudinally in accordance with variations of the regulated quantity from the desired value, and inertia means effective after a change in the speed of said drum for influencing the rotation of said drum in a reverse direction.

5. In a regulator system, a resistor, means for varying the effective value of said resistor comprising a rotary contactor drum, a shaft upon which said drum is slidably mounted and with which it revolves, means for actuating said drum in accordance with variations of the regulated quantity from the desired value, a flywheel loosely mounted on said shaft, and resilient means for connecting said flywheel to said shaft whereby, upon a change in the speed of said shaft, force will be applied to the shaft tending to restore its former speed.

6. In a regulator system, a resistor, means for varying the effective value of said resistor comprising a rotary contactor drum, means for actuating said drum to vary the position thereof in accordance with variations in the regulated quantity, and means effective upon a variation in the position of said drum for temporarily producing a counter variation to prevent hunting action.

7. In a regulator system, a resistor, means for varying the effective value of said resistor comprising a rotary contactor drum, a shaft upon which said drum is slidably mounted and with which it revolves, means for rotating said shaft in accordance with the regulated quantity, a second shaft and means for rotating said second shaft in accordance with the desired value of the regulated quantity, means differentially responsive to the speeds of the two shafts for actuating said drum longitudinally, inertia means loosely mounted upon said first named shaft and resiliently connected thereto whereby subsequent to a change in the speed of said shaft a counter force will be temporarily applied.

In testimony whereof, I have hereunto subscribed my name this 12th day of April, 1926.

STEPHEN A. STAEGE.